United States Patent [19]

Okazaki

[11] Patent Number: 4,867,856
[45] Date of Patent: Sep. 19, 1989

[54] ELECTROLYSIS UNIT FOR FORMING ELECTROLYZED WATER

[75] Inventor: Tatsuo Okazaki, Kamifukuoka, Japan

[73] Assignee: OMCO Co., Ltd., Saitama, Japan

[21] Appl. No.: 221,143

[22] Filed: Jul. 19, 1988

[30] Foreign Application Priority Data

Jul. 21, 1987 [JP] Japan .................................. 62-181703

[51] Int. Cl.⁴ .......................... C25B 15/02; C25B 9/00
[52] U.S. Cl. ..................................... 204/228; 204/260; 204/263
[58] Field of Search ............................... 204/263–266, 204/228, 260

[56] References Cited

U.S. PATENT DOCUMENTS 3,847,787  11/1974  Okazaki et al. .................. 204/263 X
4,426,261   6/1984  Fushihara ........................ 204/260 X
4,676,882   6/1987  Okazaki ............................... 204/260

Primary Examiner—Donald R. Valentine
Attorney, Agent, or Firm—Armstrong, Nikaido, Marmelstein, Kubovcik & Murray

[57] ABSTRACT

In an electrolysis unit for forming electrolyzed water, in which electrodes of polarity different from each other are opposed to each other and both of said electrodes are partitioned with an electrolyzing diaphragm into a pair of electrode chambers to define an electrolysis vessel, and a raw water supply portion and a pair of electrolyzed water discharging portions are disposed on the respective ends of said electrolysis vessel, a pair of water supply ports in communication with a pair of electrodes chambers in the electrolysis cell respectively are disposed independently of each other in the raw water supply portion.

Chemical additives can be supplied uniformly with no requirement for additional channels. Electrolyzing operation efficiency can be improved, and unit structure and assembling work can be simplified.

4 Claims, 3 Drawing Sheets

FIG.5a
FIG.5b
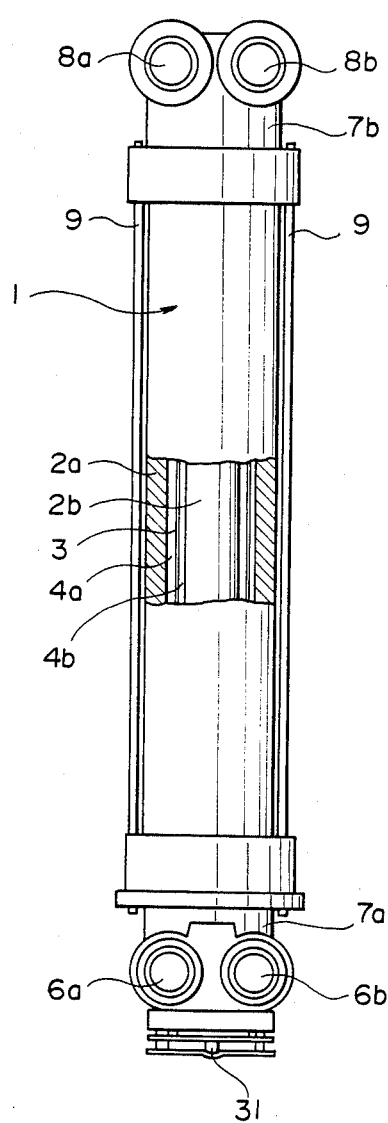
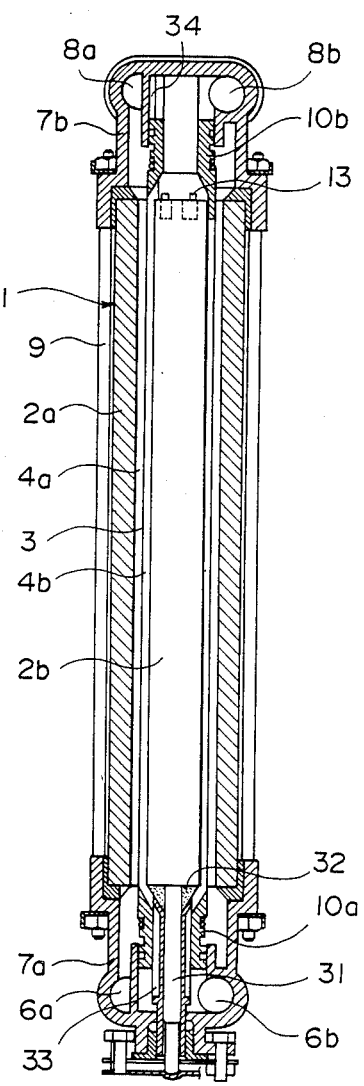

ELECTROLYSIS UNIT FOR FORMING ELECTROLYZED WATER

BACKGROUND OF THE INVENTION

1. Field of the Invention

The present invention concerns a novel electrolysis unit used in apparatus for forming electrolytically ionized water and, more specifically, it relates a novel electrolysis unit, in which two water supply ports independent of each other and in communication with an anode chamber and a cathode chamber respectively are disposed to the water supply portion of an electrolysis vessel, both of the electrodes are made of such material as capable of withstanding in the use both as the anode and the cathode and capable of continuously electrolyzing water by switching the polarity of voltage applied to both of the electrodes.

2. Description of the Prior Art

An electrolysis unit for use in a continuous water supply type electrolytically ionized water forming apparatus has been known, in which an anode and a cathode opposed to each other in an electrolysis vessel are partitioned by means of an electrolyzing diaphragm into an anode chamber and a cathode chamber, and a water supply portion is disposed on one side while a pair of electrolytically formed water discharging portions are disposed on the other side of the electrolysis vessel. Such an electrolysis unit generally comprises only one common raw water supply port to the water supply portion in communication with the anode chamber and the cathode chamber at the inside.

By the way, upon producing ionized alkaline water and acidic water in an electrolytically ionized water forming apparatus, a chemical solution is sometimes added to the raw water on the side of the anode or cathode chamber as required. In this case, since the chemical solutions added to the water in the anode chamber and to the water in the cathode chamber are different from each other, if raw water previously mixed with a chemical solution is introduced from a common water supply port, the chemical solution is supplied to both of the electrode chambers, which is not favorable.

In view of the above, a pair of chemical solution supply channels independent of each other and in communication with the anode chamber and the cathode chamber respectively are disposed on one side of the electrolysis vessel, separately from the water supply channel, and chemical solutions containing, for example, mineral additives are added from such exclusive chemical solution supply channels.

However, it has been difficult to dispose the chemical solution channel in the narrow portion at the end of the electrolysis vessel and there has been also a problem that smooth supply of the chemical solution through the narrow channel is difficult. Particularly, in a multi-vessel type electrolysis apparatus in which a plurality of electrolysis units are set and chemical solutions are supplied by a common pump, it has been extremely difficult to supply chemical solutions under constant pressure through narrow supply channels from the respective electrolysis units thereby causing uneven chemical supply.

Further, since calcium carbonate, etc. are usually deposited on the side of the cathode chamber during use of the electrolysis vessel in the electrolytically ionized water forming apparatus, the vessel has to be washed periodically and a washing water circuit therefor is necessary.

Furthermore, in the conventional electrolysis unit, since upper and lower connection members that connect the electrodes and diaphragms are different in that inner structures, individual members have to be used. And, in addition, the upper and lower connection members have been abutted against the respective ends of three members, that is, the outer electrode, the inner electrode and the electrolyzing diaphragm assembly for attaining a liquid tight connection. However a particularly high accuracy is necessary for the size and the assembling work of the members in order to abut the upper and the lower connection members against respective one ends of the three members and tightly close them altogether. Particularly, it has been difficult to incorporate the outer electrode in a liquid-tight manner.

SUMMARY OF THE INVENTION

In view of the foregoing problems, it is the first object of the present invention to provide an electrolysis unit no more requiring the use of chemical solution supply channels and capable of introducing chemical solutions together with raw water into respective electrode chambers.

The second object of the present invention is to provide an electrolysis unit capable of electrolyzing operation by switching the polarity of the voltage applied to electrodes, thereby eliminating the requirement of washing.

The third object of the present invention is to simplify the constituent members and decrease the number of the kind of components for the electrolysis unit.

The fourth object of the present invention is to provide an electrolysis unit capable of assembling the outer electrode in a liquid-tight manner.

The first object of the present invention can be attained by an electrolysis unit for forming electrolyzed water, in which electrodes of the polarity different from each other are opposed to each other and both of said electrodes are partitioned with an electrolyzing diaphragm into a pair of electrode chambers to define an electrolysis vessel, and a raw water supply portion is disposed on one side of the electrolysis vessel, while a pair of electrolyzed water discharging portions are disposed on the other side of the electrolysis vessel, wherein a pair of water supply ports in communication with a pair of electrodes chambers in the electrolysis cell respectively are disposed independently of each other in the raw water supply portion.

The second object of the present invention is attained by the electrolysis unit as described above, wherein electrode material usable in common with both of the cathode and anode capable of continuously electrolyzing water into ionized alkaline water and acidic water by switching the polarity of the electrolyzing voltage are used for the cathode and the anode.

The third object of the present invention can be attained by the electrolysis unit as described above, wherein each of the upper and the lower support members of the electrolyzing diaphragm comprises a member of an identical shape.

The fourth object of the present invention can be attained by the electrolysis unit as described above, wherein both of the upper and the lower ends for a cylindrical outer electrode, a cylindrical or columnar inner electrode and an electrolyzing diaphragm assembly carried by upper and lower support members are supported by a pair of upper and lower connection members, in which the upper connection member is opposed to and abutted against only the upper end of the outer electrode, and the diaphragm support member and the inner electrode are in a liquid-tight sliding contact on one side thereof with the inner circumferential surface of the upper connection member.

DESCRIPTION OF THE ACCOMPANYING DRAWINGS

These and other objects of the present invention will become apparent by reading the following descriptions for preferred embodiments of the present invention with reference to the accompanying drawings wherein, FIG. 1 is a vertical cross sectional view of an electrolysis unit illustrating a preferred embodiment according to the present invention;

FIG. 5(a) is a front elevational view partially in cross section of an electrolysis unit illustrating another embodiment according to the present invention; and FIG. 5(b) is a vertical cross sectional view of FIG. 5(b).

DESCRIPTION OF PREFERRED EMBODIMENTS

Preferred embodiments of the present invention are explained with reference to the accompanying drawings.

Figure 1:
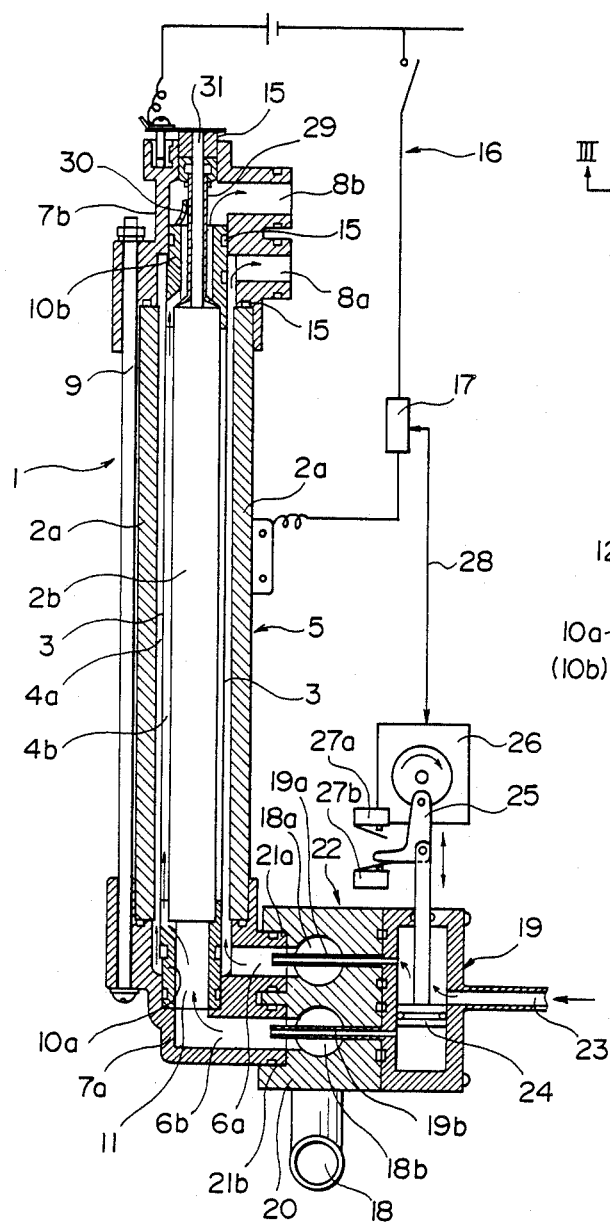

FIG. 1 is a vertical cross sectional view for the electrolysis unit illustrating a preferred embodiment according to the present invention.

In the drawing, an electrolysis unit 1 comprises an electrolysis vessel 5 containing a cylindrical outer electrode 2a and a cylindrical or columnar inner electrode 2b opposed to each other and partitioned by means of an electrolyzing diaphragm 3 into a pair of electrode chambers 4a and 4b. The electrolysis vessel 5 has, on one side thereof, a lower connection member 7a having a pair of raw water supply ports 6a and 6b independent of each other and, on the other side thereof, an upper connection member 7b having a pair of electrolyzed water discharging ports 8a and 8b. They are fitted respectively and joined integrally by a bolt 9 to each other.

Figure 2:
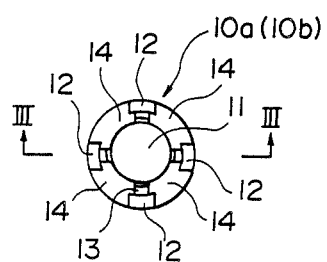
FIG. 2 is an enlarged plan view for the diaphragm support member.
Figure 3:
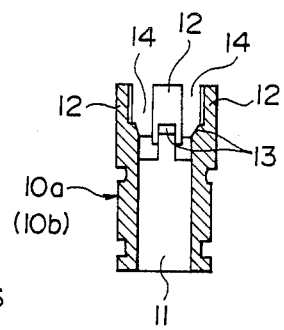
FIG. 3 is a cross sectional view taken along line III—III in FIG. 2.

The electrolyzing diaphragm 3, in a state enhousing the inner electrode 2b to its inside, is connected to lower and upper hollow support members 10a and 10b. As shown in the enlarged views of FIG. 2 and FIG. 3, each of the support members 10a and 10b has an axial channel 11 and also intermittently recessed edges 12 at one opening en side for fitting the inner electrode 2b. The edge 12 has a step 13 for abutting against the end of the inner electrode 2b and formed intermittently to the opening end. Accordingly, the channel 11 is in communication with the the electrode chamber 4b at the inside by way of the recessed portion 14.

Since each of the upper and the lower support members 10a, 10b has the structure as described above, members of an identical shape can be used as shown in the drawing.

Two raw water supply ports 6a and 6b are disposed to the lower connection member 7a, and the lower support member 10a for the electrolyzing diaphragm 3 is fitted to the lower connection member 7a such that the channel 11 is in communication with the raw water supply port 6b.

On the other hand, the top ends of the upper support member 10b and the inner electrode 2b are in sliding contact with the cylindrical inner circumferential wall of the upper connection member 7b by way of seal members 15 such as packings. Accordingly, the upper connection member 7b is abutted against and engaged with only the upper end of the outer electrode 2a, so that a liquid-tight sealing can be ensured between the outer electrode 2a and the upper and the lower connection members 7a, 7b.

In a modified structure, fingers may be disposed at two or three positions on an insulation sleeve 29 fitted over an upper electric supply rod 31 for the inner electrode, and an engagement 30 may be fitted to the fingers as an upper limit stopper for the diaphragm assembly.

Electrode material usable in common with cathode and anode electrodes and capable of electrolyzing water continuously into ionized alkaline water and ionized acidic water by the switching of the polarity for the electrolyzing voltage is used for the pair of the electrodes 2a and 2b. The electrode material usable in common with the cathode and the anode means herein those materials that can be used in common with the cathode and the anode for water electrolysis and are not harmful on drinking.

Examples of such material can include (1) ferrite; (2) magnetite; (3) ceramics applied with surface treatment of gold or platinum using glazing, as well as those ceramics mixed with other electroconductive material that can be used as an anode; (4) titanium; (5) titanium alloy; (6) noble metal-plated titanium; (7) alloy materials processed such that anodic corrosion at the surface of the electrode can be prevented by the effect of ionic charges of alloy against the consumption of the anode.

An electrical circuit 16 is connected to each of terminals 2a', 2b' of the electrodes 2a and 2b for applying a high DC voltage. A polarity reversing switch 17 may be incorporated into the electric circuit 16 for switching the polarity of the voltage applied to the electrodes 2a and 2b.

It is so adapted that electrolyzing operation can be conducted by switching the polarity between the outer electrode and the inner electrode on every predetermined time interval (for example, every 24 hours) while using electrode material usable in common with the cathode and the anode for both of the electrodes.

In the present invention, two independent water supply ports 6a and 6b are disposed to the raw water supply portion, because a chemical solution can be added previously to the raw water before entering the electrode chamber so that the chemical solution can be charged together with the raw water into a predetermined electrode chamber in the vessel.

By disposing the raw water supply portion of such a structure, it is possible to connect a pair of the water supply ports 6a and 6b of the electrolysis unit to a branched supply circuit 18a, 18b of the water supply pipe 18, so that the supply pipe of a chemical solution supply device 19 can be joined with the branched circuit 18a, 18b or the water supply ports 6a and 6b at the downstream thereof. That is, it is possible to previously mix a predetermined chemical solution to the raw water supplied to each of the electrode chambers and then fed together with the raw water.

Figure 4:
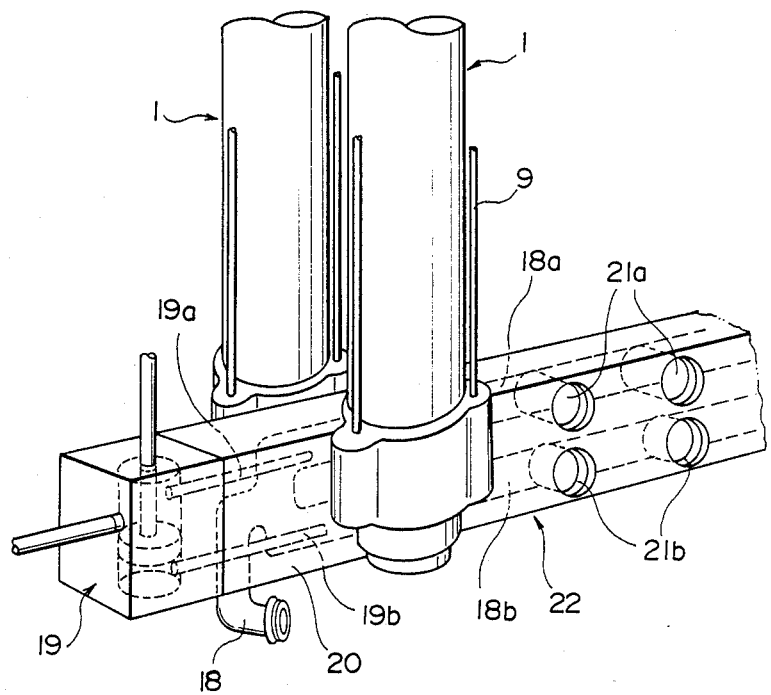
FIG. 4 is an explanatory view for the assembly in the electrolysis unit according to the present invention.

As shown in FIG. 4, a plurality pairs of mounting portions 21a and 21b in communication with the branched water supply circuit 18a, 18b are disposed in a block 20 incorporating the branched water supply circuit 18a, 18b, the supply pipes 19a and 19b of the chemical solution supply device 19 are penetrated through the branched water supply circuit 18a, 18b to constitute a mounting base member 22, and the water supply ports 6a and 6b of the electrolysis unit may be fitted to the mounting portions 21a and 21b of the base member 22 as shown in FIG. 1.

In the drawing, there are shown a chemical solution introduction pipe 23, a switching valve 24 for the flow channel of the chemical solution, a crank 25, a valve driving device 26 such as a motor, and detection means 27a, 27b such as a limit switch for detecting the position of the valve and controlling the driving device 26 by the detection signal. The driving device 26 for the chemical solution supply device 19 may be interlocked with the polarity reversing switch 17 of the voltage supply circuit 16 of the elctrolysis unit by means of an electric circuit 28, a timer, etc.

Although explanations have been made to the foregoing embodiment of using a cylindrical electrolysis unit, it is of course possible to apply the present invention to a flat type electrolysis unit, in which a flat electrodes are disposed opposed to each other.

In the embodiment shown in FIG. 1, a pair of independent raw water supply ports 6a and 6b, and the electrolyzed water discharging ports 8a and 8b are disposed in the vertical direction. Alternatively, the supply ports 6a and 6b and the discharging ports 8a and 8b may be opened horizontally to the respective connection members 7a and 7b as shown in FIG. 5. Further, the vertical position for the inner electrode 2b and the electrolysis membrane support members 10a, 10b may be reversed from that in the embodiment shown in FIG. 1 and the electric supply rod 31 for the inner electrode 2b may be engaged to the lower connection member 7a.

The inner electrode 2b is connected at its top end (lower portion in the drawing) with the electric supply rod 31 and a packing 32 for preventing the intrusion of water is fitted to the connection base thereof. An insulation sleeve 33 having an axial water passage formed therein is threadingly engaged to the electric supply rod 31 so that the sleeve urges at the top end thereof the packing 32.

Both ends of the electrolyzing diaphragm 3 are connected in a liquid-tight manner to the outer circumference of the upper and the lower support members 10a and 10b in a state where the support member 10 on one side of the electrolyzing diaphragm 3 is tightly fitted over the outerside of the sleeve 33, while the support member 10b on the other side of the electrolyzing diaphragm 3 is abutted against the rear end of the inner electrode 2b.

Thus, in the electrolysis unit of the preferred embodiment according to the present invention, the electrolysis diaphragm 3 and the inner electrode 2b are previously constituted as an integral assembly, which can be incorporated as a one-piece member upon assembling the electrolysis unit.

The paired integral assembly of the electrolysis diaphragm 3 and the inner electrode 2b is held on both sides thereof by the abutment of the rear end of the membrane support member 10b on one side against the rib 34 of the connection member 7b on one side, and urging of the top end of the electric supply rod 31 of the inner electrode 2b by the urging plate 35 of the connection member 7a on the other side. In this way, distortion for the electrolysis membrane upon assembling can be prevented.

In the electrolysis unit according to the present invention, since a pair of water supply ports independent of each other and in communication with a pair of electrode chambers respectively are disposed to the raw water supply portion, chemical solutions can be fed together with the raw water into a desired electrode chamber by previously mixing the chemical solution that is added upon electrolysis with the raw water passing through the water supply port. Accordingly, no additional passage for the supply of the chemical solution is necessary. Besides, since the chemical solution is sent together from the raw water supply channel, the concentration of the chemical solution in a plurality of electrolysis unit can be made uniform.

In addition, in a case where material resistant to anodic corrosion upon electrolysis is used in both of the electrodes opposed to each other, the electrolyzing operation can be done by switching the polarity of the applied voltage. That is, since calcium carbonate deposited on the side of the cathode is dissolved in water by the switching of the polarity, washing is no more necessary. Accordingly, since this can eliminate the requirement for the cleaning water circuit, and usual electrolysis cleaning can be done also during the time required so far for the cleaning, the working efficiency for forming the electrolyzed water can remarkably be improved.

Since the electrolysis unit according to the present invention is utilized for forming alkaline or acidic hot spring water and improvement in the working efficiency is extremely important because a great amount of electrolyzed water is required.

Furthermore, since members of an identical shape can be used for both of the upper and the lower support members 10a and 10b that support the electrolyzing diaphragm, the number of kind of components can be decreased and the assembling work can be facilitated.

Further, since the upper portions of the upper support member 10b for the diaphragm and the inner electrode 2b are in sliding contact with the inner circumferential wall of the upper connection member 7b and, as a result, the upper connection member 7b abuts only against the outer electrode 2a constituting the outer cylinder for the electrolysis vessel, the liquid-tight structure can be ensured. Furthermore, since the diaphragm 3 and the inner electrode 2b are previously constituted as an integral assembly, the electrolysis unit can be assembled with ease.

In the electrolysis unit according to the present invention, since independent water supply ports and discharge ports directly connected with external supply and discharging pipes are disposed to each of the units, voltage withstanding performance can be improved in a case of a composite electrolysis device comprising a plurality of units connected with each other.

What is claimed is:

1. An electrolysis unit for forming electrolyzed water, comprising:
    inner and outer electrodes of polarity different from each other and are opposed to each other;

an electrolyzing diaphragm which partitions both of said electrodes into a pair of separate electrode chambers to define an electrolysis vessel;

a raw water supply portion which is disposed on one side of the electrolysis vessel; and a pair of electrolized water discharging portions which are disposed on the other side of said electrolysis vessel, wherein a pair of water supply ports being in independent communication with said pair of electrode chambers, respectively, in the electrolysis cell and being respectively disposed independently of each other in the raw water supply portion.

2. An electrolysis unit as defined in claim 1, wherein electrode material useable in common with both of the cathode and anode capable of continuously electrolyzing water into ionized alkaline water and acidic water by switching the polarity of the electrolyzing voltage are used for the cathode and the anode.

3. An electrolysis unit as defined in claim 1 or 2, wherein each upper and the lower support members for the electrolyzing diaphragm comprises a member of an identical shape.

4. An electrolysis unit as defined in claim 1 or 2, wherein both of the upper and the lower ends for a cylindrical outer electrode, a cylindrical or columnar inner electrode and an electrolizing diaphragm assembly carried by upper and lower support members are supported by a pair of upper and lower connection members, wherein said upper connection member is opposed to and abutted against the upper end of said outer electrode, and wherein the diaphragm support member and the inner electrode are in a liquid-tight sliding contact on one side thereof with the inner circumferential surface of said upper connection member.

* * * * *